United States Patent Office 3,272,396
Patented Sept. 13, 1966

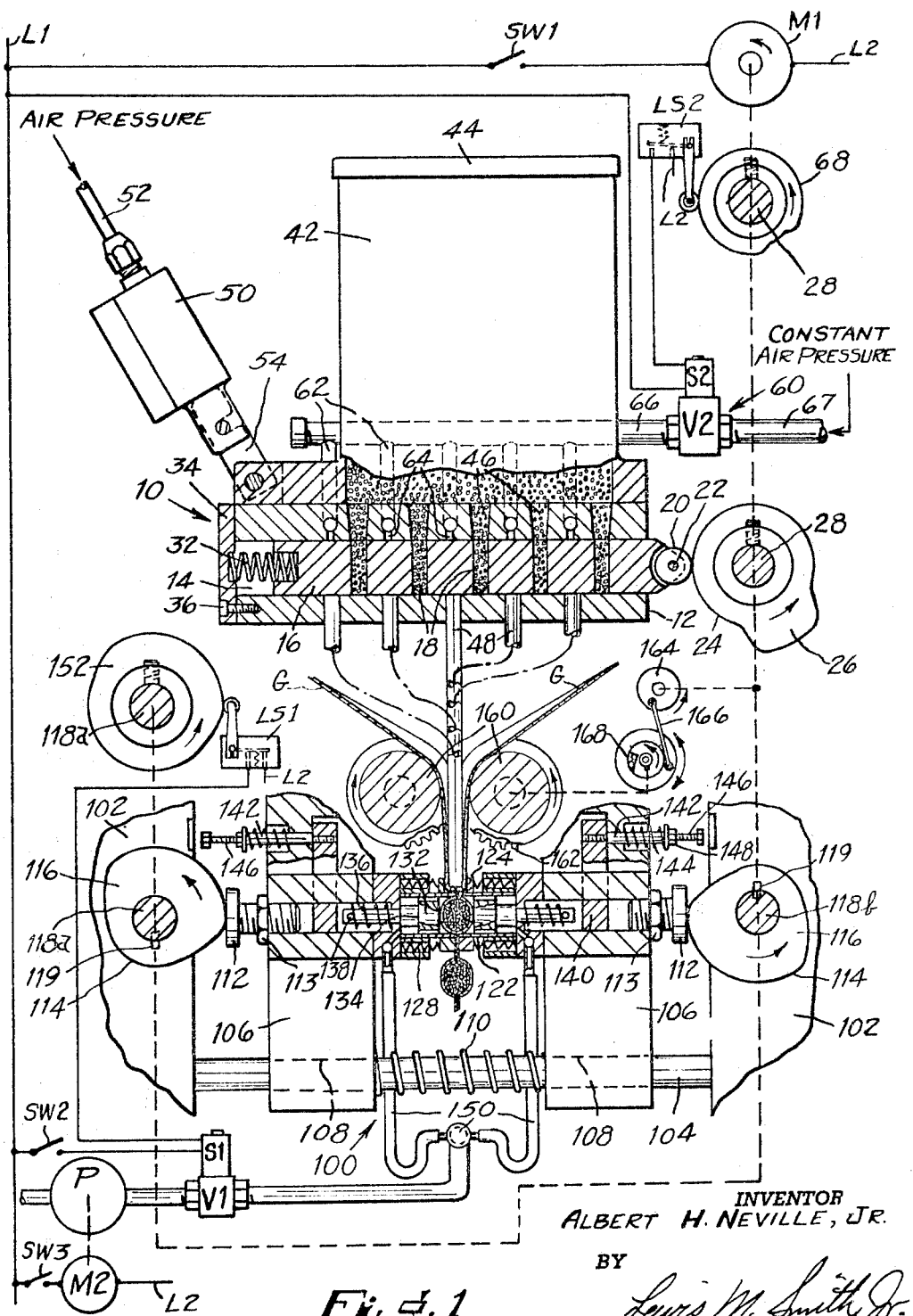

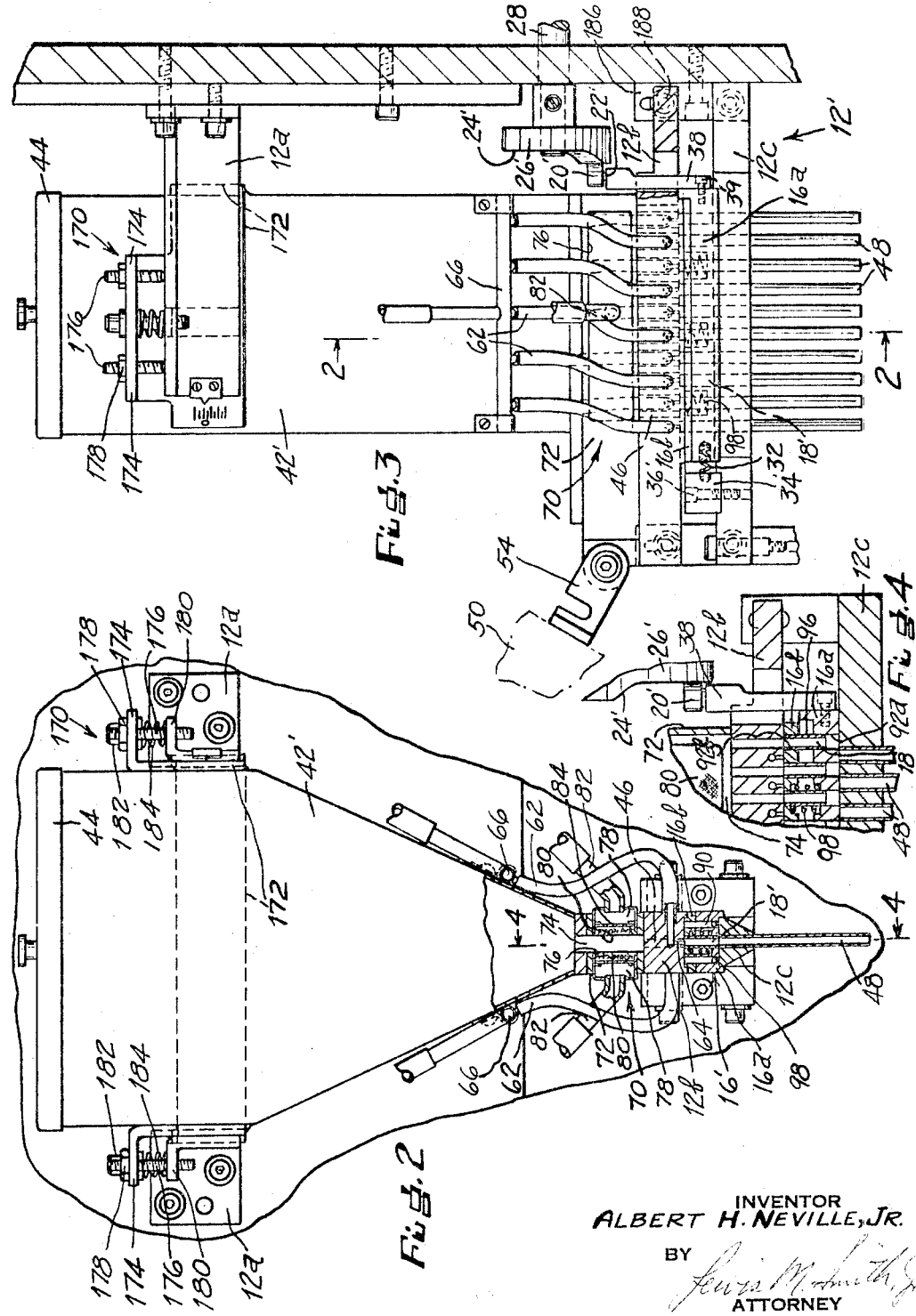

3,272,396
METERING AND DISCHARGING APPARATUS
Albert H. Neville, Jr., Worcester, Mass., assignor to Norton Company, Worcester, Mass., a corporation of Massachusetts
Filed Dec. 23, 1964, Ser. No. 420,551
4 Claims. (Cl. 222—194)

The present invention relates to metering and discharging apparatus, and more particularly to an improvement in apparatus for metering and discharging precisely controlled quantities of dry particulate material at a rapid cyclic rate.

While it will be evident from consideration of the following detailed description and the accompanying illustrations of metering and discharging apparatus and the improvement therein comprising the instant invention that such apparatus may be used for various different applications in which it is desirable to deliver successive precisely controlled quantities of a dry particulate material at a rapid rate, this type of metering and discharging apparatus has been aranged to be particularly useful for filling soft shelled gelatin capsules with pharmaceuticals consisting of dry particulate material or with other dry particulate material ranging in size from fine powders to generally spherical pellets having maximum dimensions of several hundredths of an inch.

Since many factors including environmental conditions and the properties of the dry particulate material being metered affect the quantities of dry particulate material delivered by volumetric metering chambers of a given size, the instant invention contemplates an improvement in metering and discharging apparatus for dry particulate material which provides an arrangement for quickly adjusting the size of the volumetric metering chambers as necessary to deliver successive batches of the same dry particulate material or different dry particulate materials in the particular precisely controlled quantities desired.

In general, the type of metering and discharging apparatus to which the instant invention may conveniently be applied consists of a supporting means on which is mounted a container for a dry particulate material such as a powder or small pellets, and a metering or measuring member provided with one or more volumetric metering chambers and slidably mounted upon the supporting means for cyclic movement between a first position in which the metering chamber or chambers are filled with dry material from the container and a second position in which the quantity of dry material contained in each metering chamber is discharged therefrom into a tubular discharge member.

Such apparatus may also include an agitating means continuously operable to keep the dry particulate material moving in such a way that it flows into and out of the metering chamber or chambers in the desired quantity without clogging the apparatus and a pulsing means connected to the supporting means to discharge pressurized gas against the dry particulate material in the metering chamber or chambers when the metering chamber or chambers are aligned with the tubular discharge members.

Such apparatus necessarily includes a drive means operable to move the metering or measuring member back and forth between its first and second positions and to actuate the pulsing means cyclically in coordinated relation to the movement of the metering or measuring member.

As noted above, metering and discharging apparatus of the type described generally above which is arranged to include the improvement comprising the instant invention is particularly useful in combination with the type of encapsulating machine arranged to produce filled soft shelled gelatin capsules described and illustrated in Patent No. 2,549,327, issued April 17, 1951. When so used, metering and discharging apparatus incorporating the instant invention is installed so that it replaces the pump assembly 16 for metering fluid fill described in Patent No. 2,549,327 or the valve and pump assembly illustrated and described in Patent No. 2,638,052, issued May 12, 1953. When metering and discharging apparatus incorporating the instant invention is so used, it is also necessary to substitute a single set of opposed reciprocating capsule forming dies of the type illustrated in Patent No. 2,513,581, issued July 4, 1950, for the double set of opposed reciprocating capsule forming dies described and illustrated in Patent No. 2,549,327.

An object of this invention is the provision in apparatus for metering and discharging successive precisely controlled quantities of a given dry particulate material of means readily adjustable to vary the quantities delivered.

Another object of this invention is the provision in apparatus for metering and discharging dry particulate material of a metering means selectively adjustable to vary the precisely controlled quantities of dry particulate material discharged as desired or required for a given application.

Still another object is the provision in apparatus for metering and discharging precisely controlled quantities of dry particulate material of a measuring member provided with volumetric metering chambers the size of which is selectively adjustable to any size within a predetermined range of sizes.

Yet another object of this invention is the provision in apparatus for metering and discharging dry particulate material of a metering member including at least two slidably interfitted portions selectively relatively movable to vary the size of volumetric metering chambers formed thereby.

Other objects and advantages of the instant invention will be evident from careful consideration of the following detailed description of this invention and of the showing in the accompanying drawings wherein:

FIG. 1 is a simplified schematic representation, partially in section, of one form of apparatus of the type to which the instant invention may be applied useful for metering and discharging dry particulate material and particularly suitable for metering and discharging relatively large dry pellets, also illustrating the operative relationship between such metering and discharging apparatus and the cooperating elements of a machine for making filled soft shelled gelatin capsules;

FIG. 2 is a front elevation, partially sectioned substantially on line 2—2 of FIG. 4, of another form of such apparatus to which the instant invention is shown applied useful for metering and discharging dry particulate material and particularly suitable for metering and discharging very fine dry particles of the size generally referred to as powder;

FIG. 3 is a side elevation of the embodiment of the instant invention illustrated in FIG. 2; and FIG. 4 is a partial vertical section taken on line 4—4 of FIG. 2 showing details of the measuring or metering member of the instant invention readily adjustable to vary the volume of the dry particulate material metered during each operating cycle.

Referring now to the drawings, wherein like reference numerals refer to like or corresponding parts, FIG. 1 includes a simplified schematic representation of one type of metering and discharging apparatus to which the instant invention may conveniently be applied, generally designated by the reference numeral 10. Since the apparatus illustrated in FIG. 1 is described in detail in copending application Ser. No. 371,992, filed June 2, 1964, the description of this apparatus here will be limited to the observation that this apparatus includes a supporting member 12 provided with an elongated central opening 14 either formed integrally in the supporting member 12 as illustrated in FIG. 1 or in a suitable elongated housing formed separately and fixedly secured to the supporting member 12. This apparatus also includes an elongated metering member 16 provided with one or more generally cylindrical transversely extended metering chambers 18 and mounted slidably within and in closely interfitted relationship with the central opening 14 so that it may be reciprocated between a first position in which each metering chamber 18 is filled with a predetermined quantity of a dry particulate material and a second position in which the dry particulate material is discharged from each metering chamber 18.

It will be evident that the metering and discharging apparatus illustrated in FIG. 1 can be arranged to deliver different precisely controlled predetermined unit quantities of a dry particulate material by suitable variation of the volume of each metering chamber 18 in the reciprocating metering member 16. For example, this change may be accomplished by removing the cover plate 34 from the supporting member 12 and substituting for a given metering member 16 another metering member 16 provided with a corresponding number of metering chambers 18 each having a different volume than that of the corresponding metering chamber 18 in the replaced metering member 16. Alternatively, this change may be accomplished by removing the metering member 16 from the supporting member 12 in order to insert in each of the metering chambers 18 an annular sleeve of the thickness necessary to reduce the volume of each metering chamber 18 by the desired amount. However, the number of changes available by either of these means is limited by the number of different metering members 16 available or by the number of sets of sleeves provided. Moreover, neither of these procedures is well suited to the making of minute volume adjustments in the unit quantities of dry particulate material delivered by such metering and discharging apparatus.

Obviously, it is necessary to change the volume of each metering chamber 18 whenever a different unit quantity of dry particulate material is to be delivered. Moreover, such a change is sometimes necessary even when the same quantity of a different material with different physical properties is to be delivered. Finally, since the physical properties of a given material may vary slightly from batch to batch, a minute change of volume may be necessary from time to time in order to continue to deliver the desired precise unit quantities of the same material.

Adjustment of the volume of the metering chambers is facilitated by the incorporation in metering and discharging apparatus 10 of a single selectively adjustable metering member, one embodiment of which is illustrated in FIGS. 2, 3, and 4 and generally designated in FIG. 2 by reference numeral 16'. The incorporation of an adjustable metering member 16' is particularly important in any application where it is frequently necessary to change or make minor adjustment of the volume of the metering chambers 18', since such changes and adjustments can be made quickly and accurately without dismantling any portion of a metering and discharging apparatus in which this feature is incorporated.

Referring now to the showing in FIGS. 2 and 3, it will be seen that the metering and discharging apparatus illustrated therein includes a container 42' enclosed by a cover 44 and adjustably supported on suitable supporting means 12' including relatively fixed supporting brackets 12a, a relatively adjustable constraining portion 12b, and a relatively fixed supporting portion 12c with a plurality of tubular discharge members 48 secured to and dependent from the supporting portion 12c.

The metering and discharging apparatus illustrated in FIGS. 2 and 3 includes an agitating means generally designated by the reference numeral 70 including an elongated housing 72 interposed between the bottom of the container 42' and the constraining portion 12b of the supporting means 12' and provided with a vertical passage 74 therethrough interconnecting the slot in the bottom of the container 42' and a number of passages 46 through the constraining portion 12b corresponding to the number of metering chambers 18' in metering member 16'. The opposite sides of the housing 72 are provided with openings 76 therethrough shaped to receive a pair of air chambers 78 each enclosed on the side adjacent to the passage 74 by a diffuser 80 which consists of a layer of porous material and each connected to an air pressure supply line 82. In order to equalize the flow of air through different portions of each of the diffusers 80, it may be necessary to screen a portion of each diffuser 80 opposite each air pressure supply line 82 with a solid or perforate baffle 84.

While an agitating means comprising an air driven vibrator assembly 50 is effective to maintain the flow of relatively large generally spherical pellets through the apparatus described here, an agitating means of this type tends to compact fine powders so that the flow of such powders through this apparatus is not maintained at a constant level. Accordingly, the agitating means 70 comprising an aerator assembly as described above and illustrated in FIGS. 2 and 3 of the drawings is substituted for the air driven vibrator assembly 50 when the dry material being metered and discharged by this apparatus is a fine powder.

For some types of relatively large dry particulate material, the metering and discharging operation is performed most satisfactorily using both the agitating means 70 and an air driven vibrator assembly 50. For this reason, the metering and discharging apparatus illustrated in FIGS. 2 and 3 may be provided with a mounting bracket 54 for an air driven vibrator assembly 50 secured to the housing 72 as shown in FIG. 3 or elsewhere on this apparatus close to the metering member 16'. Since air driven vibrators of the type required for this purpose are available commercially, and since the features of such a vibrator form no part of the instant invention, the details of this vibrator will not be described or illustrated herein.

The embodiment of the instant invention illustrated in FIGS. 2 and 3 includes the adjustable metering member generally designated in FIG. 2 by the reference numeral 16' mounted slidably between the supporting portion 12c and the constraining portion 12b of the supporting means 12' for reciprocating movement produced by the cam follower 20' rotatably supported on the cam follower pivot 22' secured to the metering member 16' by any suitable means such as the arm 38 secured by screws 39 as illustrated in FIG. 3. The cyclic displacement of the cam follower 20' is produced by the cam surface 24' of the driving cam 26' secured to the shaft 28 for rotation therewith, and return movement of the metering member 16' to the right as seen in FIG. 3 is produced by the biasing spring 32 constrained by end block 34' secured by means of retaining screws 36' to the base portion 12a of the supporting means 12'.

Since the drive train for operating the apparatus comprising the instant invention may be provided by additions to or suitable modification of the existing drive train for the apparatus with which it is associated in a given operation, for example an encapsulating machine of the type illustrated and described in detail in U.S. Patent No. 2,549,327, and since the details of this drive train form no part of this invention, FIG. 1 simply includes schematic representations of various driving cams and control cams shown as mounted upon a rotatable shaft 28 and on rotatable shafts 118a and 118b in the proper angular relationship for rotation as indicated by the respective arrows, and the showing in FIG. 3 is limited to representations of a cam follower 20' actuated by the cam surface 24' of a cam 26' mounted on shaft 28.

However, it will be evident that the respective cams may in fact be supported on various different elements of a drive train which are operatively interconnected to produce properly coordinated cyclic operations of the various components driven or controlled by the respective cams.

Likewise, since details of such units form no part of the instant invention, the sources of air pressure at various levels for various uses is not illustrated, the main drive motor M1 controlled by switch SW1 is illustrated schematically and the vacuum pump P is illustrated schematically as driven by motor M2 controlled by switch SW3.

The adjustable metering member 16' illustrated in FIGS. 2 and 3 and in detail in FIG. 4 is arranged to provide metering chambers 18' selectively adjustable to different volumes as required for different operations. As illustrated in FIGS. 2, 3 and 4, the metering member 16' arranged to provide this feature consists of a lower elongated relatively fixed base portion 16a slidable upon the upper surface of supporting portion 12c of the supporting means 12' and an elongated relatively movable volumetric control portion 16b slidable along the under surface of the constraining portion 12b of the supporting means 12'.

The base portion 16a and the volumetric control portion 16b may be maintained in alignment for reciprocating movement together as a unit by any suitable means such as the guide pins 90 which may be secured in the volumetric control portion 16b and may be slidable in holes through the base portion 16a as illustrated in FIG. 2. Each of the metering chambers 18' consists of vertically aligned holes 92a and 92b through the respective portions 16a and 16b of the metering member 16' interconnected notwithstanding limited relative displacement of the respective portions 16a and 16b by a thin walled sleeve 96 which may be secured within the hole 92b through the volumetric control portion 16b and be slidable within the hole 92a through the base portion 16a. The desired relative positions of the base portion 16a and the volumetric control portion 16b of the metering member 16' are maintained for any given setting of the constraining portion 12b of the supporting means 12' by a plurality of biasing springs 98 which may conveniently be seated in enlarged recesses concentric of selected holes 92a and 92b through the respective portions 16a and 16b of metering member 16' as illustrated in FIGS. 2, 3 and 4.

The positioning means illustrated in FIGS. 2 and 3 for adjusting the constraining portion 12b of the supporting means 12', generally designated by the numeral 170, includes a U-shaped supporting bracket 172 secured to the container 42' and provided with ears 174 each fitted with a pair of stop screws 176 threadably engaged therewith and secured by locknuts 178 so that they bear against the upper surface of an ear 180 projecting horizontally from one of the supporting brackets 12a. The positioning means also includes a pair of retaining screws 182 each surrounded by a biasing spring 184 and threadably engaged with the ear 180 projecting from one of the supporting brackets 12a. Since each of the retaining screws 182 passes through a hole in one of the ears 174 of the supporting bracket 172 with its enlarged head above that ear 174, these screws 182 may be tightened to maintain stop screws 176 in engagement with the ears 180 and thereby maintain the container 42' in fixed relation to the supporting portion 12c of the supporting means 12' with the constraining portion 12b positioned to maintain the desired relationship between the portion 16a and 16b of the metering member 16'.

The vertical alignment of the constraining portion 12b and the supporting portion 12c of the supporting means 12' is maintained by brackets 186 secured to the supporting portion 12c and provided with vertical slots to receive screws 188 threadably engaging the constraining portion 12b and which may be loosened to permit vertical adjustment of the constraining portion 12b and then be tightened to secure the constraining portion 12b in the desired position for a given operation.

Since the operation of the apparatus illustrated in FIG. 1 is described in detail in copending application Serial No. 371,992, filed June 2, 1964, this operation will not be discussed here.

When metering and discharging apparatus for dry particulate material includes an adjustable metering member 16' and adjustable support for the container 42' according to the instant invention, the desired adjustment can be effected quickly by first releasing the screws 188 engaging the slotted brackets 186 and then by making suitable adjustments of the stop screws 176 and the retaining screws 182 to adjust the position of the container 42' and thus the position of the constraining portion 12b relative to the supporting portion 12c of the supporting means 12'. This adjustment is facilitated by providing a scale on the supporting bracket 172 and a cooperatnig pointer attached to one of the supporting brackets 12a as shown in FIG. 3.

Aside from the adjustment of the metering member 16' in the manner described above, the operation of metering and discharging apparatus equipped with the adjustable metering member 16' is the same as the operation of the metering and discharging apparatus illustrated in FIG. 1 and described in detail in copending application Serial No. 371,992.

The flexibility of metering and discharging apparatus for dry particulate material is greatly enhanced by the provision in such apparatus of a measuring or metering member readily adjustable in the manner described herein, in order to vary the unit volume of dry particulate material being metered and discharged by such apparatus without dismantling such apparatus and without reworking or replacing any parts of such apparatus.

Since various details of this invention are subject to modification, it is to be understood that the embodiment thereof described above and shown in the accompanying drawings is to be interpreted as illustrative only and not in a limiting sense, and that the scope of this invention is defined by the claims appended hereto.

What is claimed is:

1. Apparatus for metering and discharging successive precisely controlled unit quantities of dry particulate material comprising a supporting means including a fixed lower portion and a relatively movable upper portion adjustably mounted in fixed relation to the fixed lower portion of said supporting means, a container for dry particulate material mounted for displacement with the relatively movable upper portion of said supporting means, at least one outlet for dry particulate material through the fixed lower portion of said supporting means, a metering member movably mounted between the fixed lower portion and the relatively movable upper portion of said supporting means adjustable in response to displacement of the relatively movable upper portion of said supporting means to vary the volume of at least one metering chamber within said metering member, said metering member being movable between a first position in which each metering chamber receives a predetermined quantity of dry particulate material from said container and a second position in which the same predetermined quantity of dry particulate material is discharged through each said outlet, the predetermined quantity of dry particulate material received in and discharged from each metering chamber being determined by the vertical adjustment of said container and said relatively movable upper portion of said supporting means relative to the fixed lower portion of said supporting means.

2. Apparatus as described in claim 1 wherein said metering member includes first and second slidably interfitted portions biased apart and respectively into sliding engagement with spaced opposing surfaces of the fixed lower portion and the relatively movable upper portion of said supporting means.

3. Apparatus for metering and discharging successive precisely controlled unit quantities of dry particulate material comprising a supporting means including a fixed lower portion and a relatively movable upper portion adjustably mounted upon the fixed lower portion of said supporting means, a container for dry particulate material mounted for displacement with the relatively movable upper portion of said supporting means, releasable means for securing said container and said relatively movable upper portion in a selected fixed relation to said fixed lower portion of said supporting means, a series of outlets for dry particulate material through the fixed lower portion of said supporting means, a metering member slidably mounted between the fixed lower portion and the relatively movable upper portion of said supporting means including first and second interfitted portions with biasing means interposed therebetween so that they are automatically relatively adjustable in response to vertical displacement of the relatively movable upper portion of said supporting means to vary the volume of each of a series of metering chambers within said metering member, said metering member being movable horizontally and lengthwise thereof between a first position in which each metering chamber receives a predetermined quantity of dry particulate material from said container and a second position in which the same predetermined quantity of dry particulate material is discharged through one of said series of outlets, the predetermined quantity of dry particulate material received in and discharged from each metering chamber being determined by the adjustment of said container and said relatively movable upper porton of said supporting means relative to the fixed lower portion of said supporting means.

4. Apparatus as described in claim 3 wherein a tubular discharge member is connected to and dependent from the fixed lower portion of said supporting means in alignment with each of said series of outlets therethrough, whereby succeeding unit quantities of dry particulate material are delivered to a series of fixed predetermined locations notwithstanding the adjustment of said container and said relatively movable upper portion of said supporting means.

References Cited by the Examiner

UNITED STATES PATENTS

| | | | |
|---|---|---|---|
| 2,527,960 | 10/1950 | Rapp | 222—267 |
| 2,582,891 | 1/1952 | Strauss | 222—267 X |
| 3,179,304 | 4/1965 | Heibrunn | 222—267 |

ROBERT B. REEVES, *Primary Examiner.*

STANLEY H. TOLLBERG, *Examiner.*